United States Patent
Bakshi et al.

(10) Patent No.: US 12,175,227 B2
(45) Date of Patent: Dec. 24, 2024

(54) SYSTEM AND METHOD FOR GENERATING AND TRANSMITTING VISUALIZED SOFTWARE CODE RELEASE AND DEPLOYMENT FUNCTIONS TO A MIXED REALITY ENVIRONMENT

(71) Applicant: BANK OF AMERICA CORPORATION, Charlotte, NC (US)

(72) Inventors: Sakshi Bakshi, New Delhi (IN); Durga Prasad Kutthumolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 116 days.

(21) Appl. No.: 18/123,124

(22) Filed: Mar. 17, 2023

(65) Prior Publication Data

US 2024/0311117 A1 Sep. 19, 2024

(51) Int. Cl.
G06F 8/61 (2018.01)
G06F 8/71 (2018.01)

(52) U.S. Cl.
CPC . G06F 8/61 (2013.01); G06F 8/71 (2013.01)

(58) Field of Classification Search
None
See application file for complete search history.

(56) References Cited

U.S. PATENT DOCUMENTS

| | | | |
|---|---|---|---|
| 7,865,888 B1 * | 1/2011 | Qureshi | G06N 5/048 717/170 |
| 9,134,964 B2 | 9/2015 | Hirsch et al. | |
| 9,569,198 B2 | 2/2017 | Spivak et al. | |
| 9,875,580 B2 | 1/2018 | Cannon et al. | |
| 10,242,032 B2 * | 3/2019 | Sundaresan | G06F 16/5854 |
| 10,635,410 B2 | 4/2020 | Polisky et al. | |
| 10,831,463 B2 | 11/2020 | Liu et al. | |
| 11,275,570 B1 | 3/2022 | Collins et al. | |
| 11,442,764 B2 | 9/2022 | Cao et al. | |
| 11,514,073 B2 | 11/2022 | Boychev et al. | |
| 11,714,621 B2 | 8/2023 | Govindaraju et al. | |
| 11,722,554 B2 | 8/2023 | Keren et al. | |
| 11,775,277 B2 | 10/2023 | Xue et al. | |
| 2008/0046484 A1 * | 2/2008 | Ellis | G06Q 10/063114 |

(Continued)

*Primary Examiner* — Philip Wang
(74) *Attorney, Agent, or Firm* — Moore & Van Allen PLLC; Anoohya Yarlagadda

(57) ABSTRACT

Embodiments of the present invention provide a system for generating and transmitting visualized software code release and deployment functions to a mixed reality environment. The system is configured for determining that a user has submitted a software code associated with a software code release of a software application, identifying, one or more components in the software code, generating a release file comprising at least information associated with the one or more components, generating a summary file comprising a summary of the release file, transmitting the summary file to a distributed computing environment, converting the summary file to an immersive visualized file in the distributed computing environment, and displaying the immersive visualized file to one or more users comprising the user in the distributed computing environment, wherein the distributed computing environment is integrated with a mixed reality environment for displaying the immersive visualized file to the one or more users.

20 Claims, 6 Drawing Sheets

(56) References Cited

U.S. PATENT DOCUMENTS

| | | | |
|---|---|---|---|
| 2011/0307548 A1* | 12/2011 | Fisk | H04L 67/55 709/203 |
| 2013/0346956 A1* | 12/2013 | Green | G06F 8/65 717/168 |
| 2015/0046938 A1* | 2/2015 | Qian | H04N 21/2353 725/25 |
| 2017/0337055 A1* | 11/2017 | Bandera | G06F 8/73 |
| 2022/0066764 A1* | 3/2022 | Rosenzwig | G06F 8/63 |
| 2023/0162736 A1 | 5/2023 | Jo et al. | |
| 2023/0283658 A1* | 9/2023 | Kumar | H04L 67/1053 709/223 |
| 2024/0103853 A1* | 3/2024 | Pfeiffer | G06F 8/71 |
| 2024/0118884 A1* | 4/2024 | Liu | G06F 8/71 |

\* cited by examiner

SYSTEM AND METHOD FOR GENERATING AND TRANSMITTING VISUALIZED SOFTWARE CODE RELEASE AND DEPLOYMENT FUNCTIONS TO A MIXED REALITY ENVIRONMENT

BACKGROUND

There exists a need for a system for generating and transmitting visualized software code release and deployment functions to a mixed reality environment.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of embodiments in a summary form as a prelude to the more detailed description that follows.

Embodiments of the present invention address the above needs and/or achieve other advantages by providing apparatuses (e.g., a system, computer program product and/or other devices) and methods for generating and transmitting visualized software code release and deployment functions to a mixed reality environment. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that the user has submitted, to a version control application, a software code associated with a software code release of a software application, in response to determining that the user has submitted the software code, identifies, one or more components in the software code that are associated with the software code release, automatically generates a software code release file comprising at least information associated with the one or more components, generates a summary file comprising a summary of the software code release file, transmits the summary file to a distributed computing environment, converts the summary file to an immersive visualized file in the distributed computing environment, and displays the immersive visualized file to one or more users comprising the user in the distributed computing environment, wherein the distributed computing environment is integrated with a mixed reality environment for displaying the immersive visualized file to the one or more users.

In some embodiments, the present invention extracts one or more logs associated with historical software code releases associated with the software application and other software applications similar to the software application, identifies one or more patterns in the software code that match log information in the one or more logs, and identifies one or more exceptions associated with the software code release based on the one or more patterns.

In some embodiments, the present invention generates one or more actions to resolve the one or more exceptions. In some embodiments, the present invention generates the software code release file comprising the one or more exceptions and the one or more actions to resolve the one or more exceptions.

In some embodiments, the present invention categorizes the one or more exceptions associated with the software code release.

In some embodiments, the present invention auto-configures roles associated with the one or more users based on historical data to handle the one or more exceptions associated with the software code release.

In some embodiments, the present invention allows the one or more users to deploy the software code via the mixed reality environment to a real-time environment after resolving the one or more exceptions associated with the software code release.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
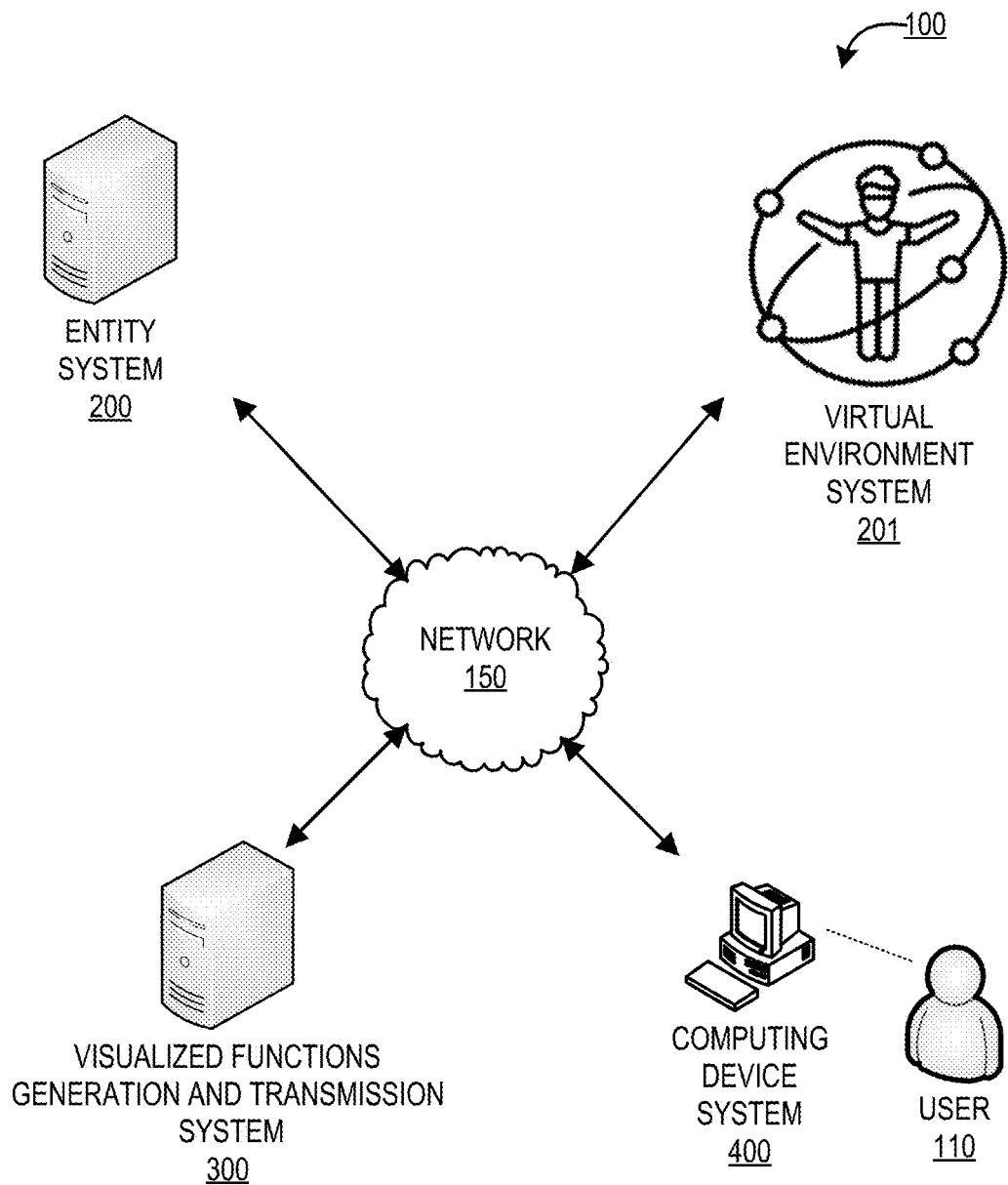
Figure 2:
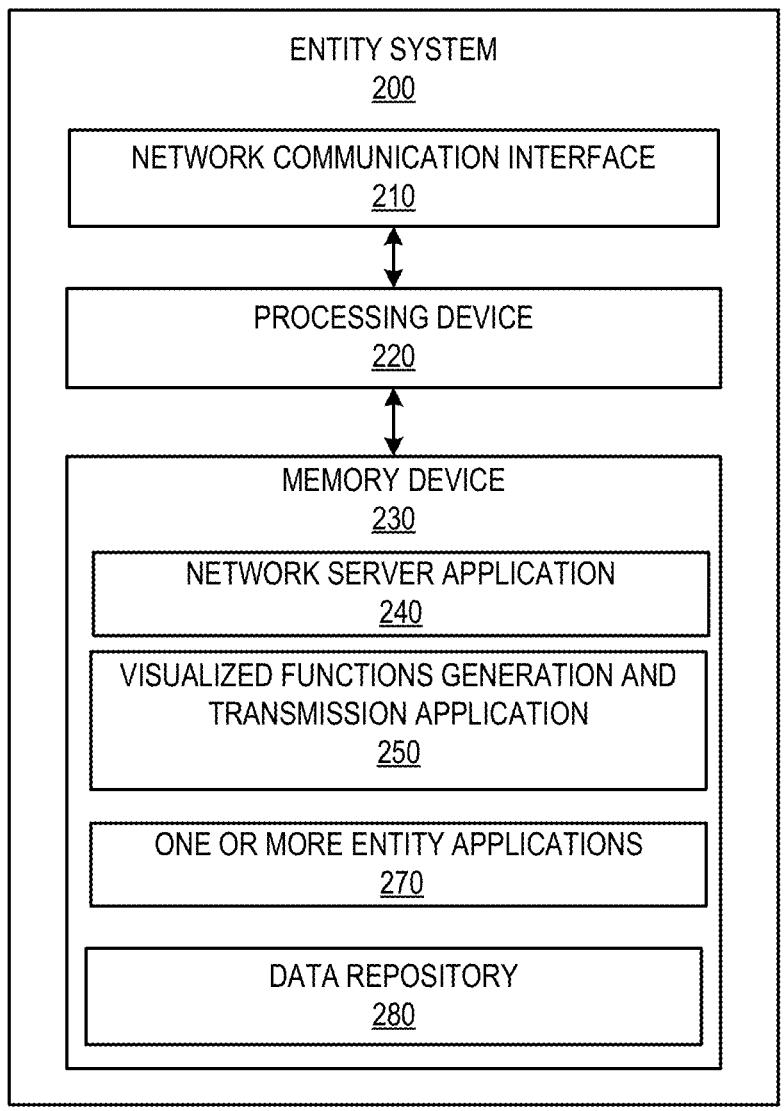
Figure 3:
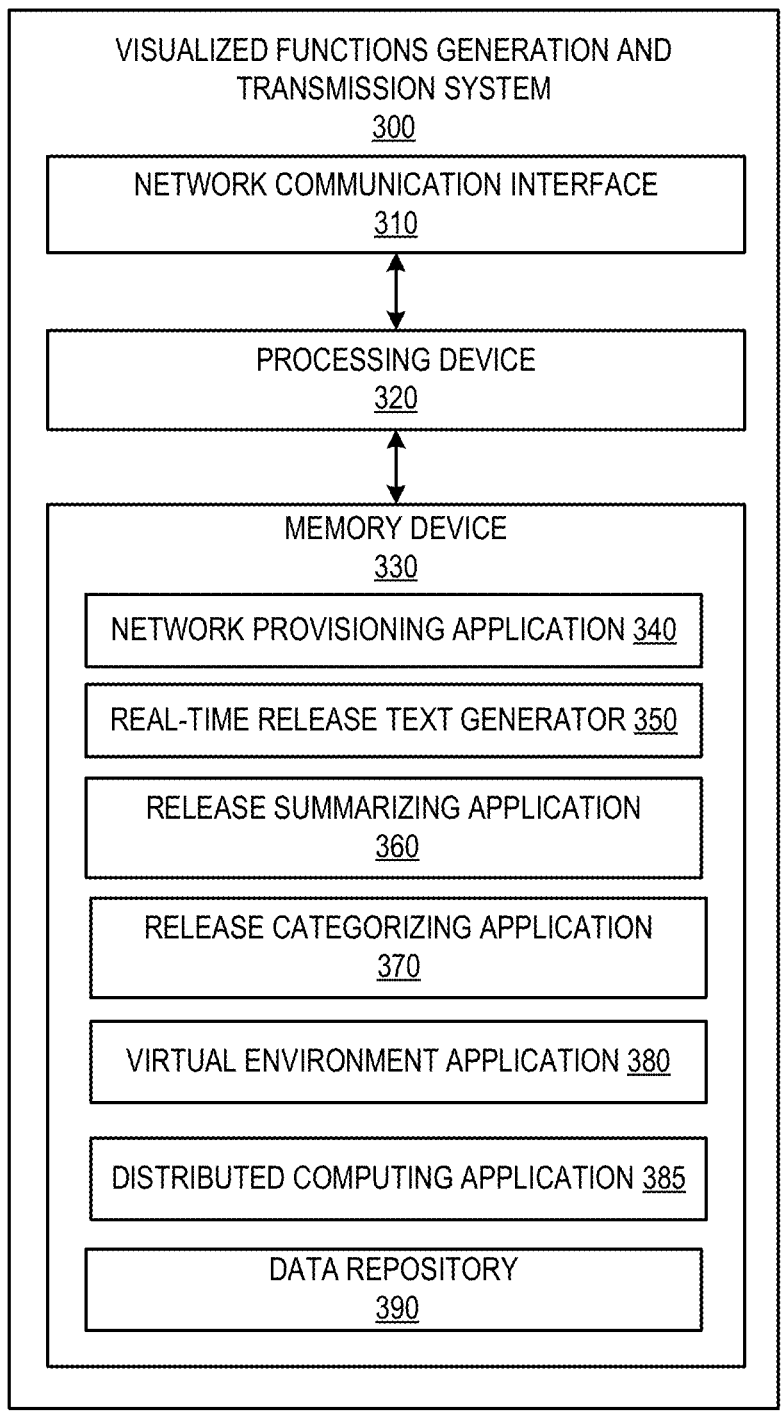
Figure 4:
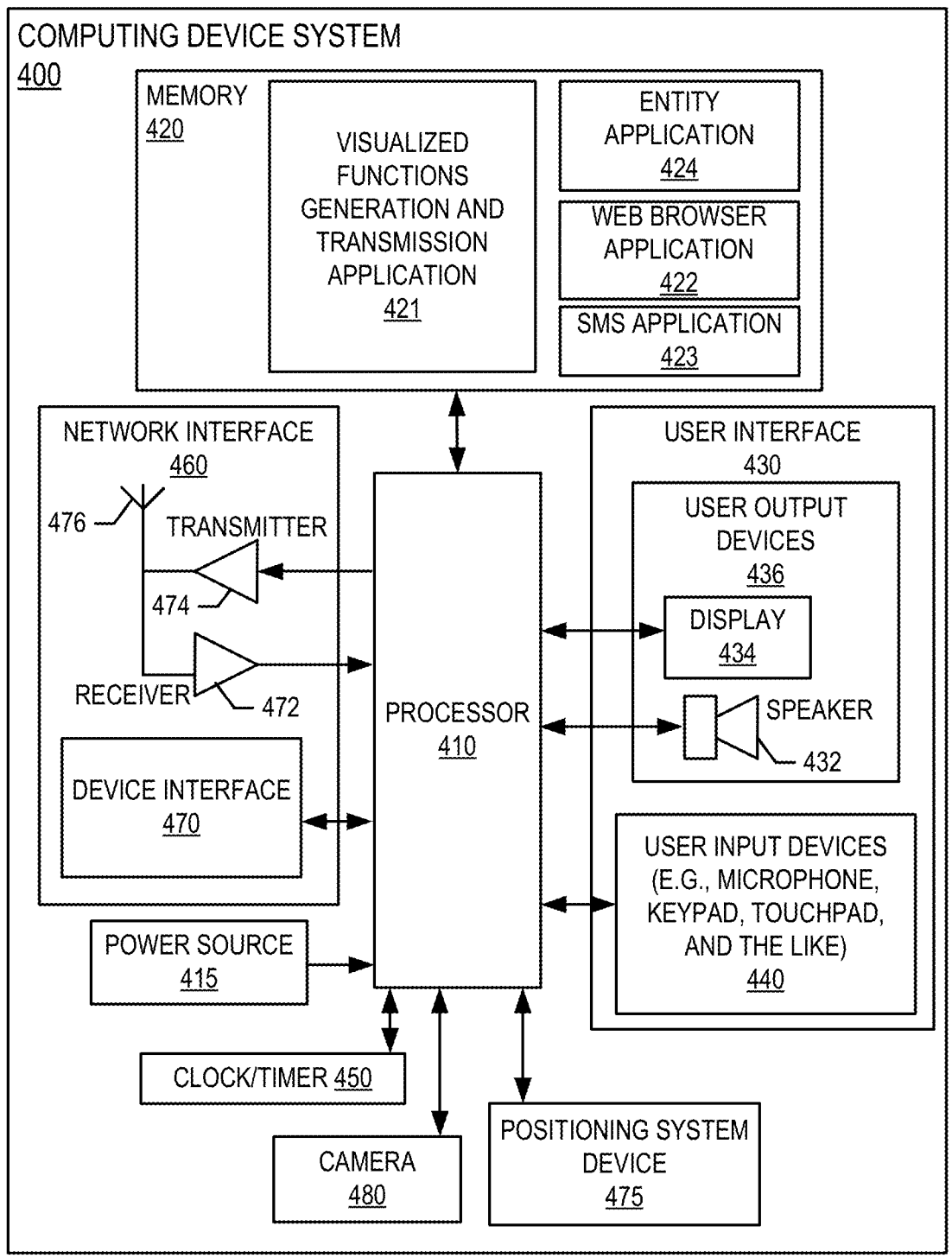
Figure 5:
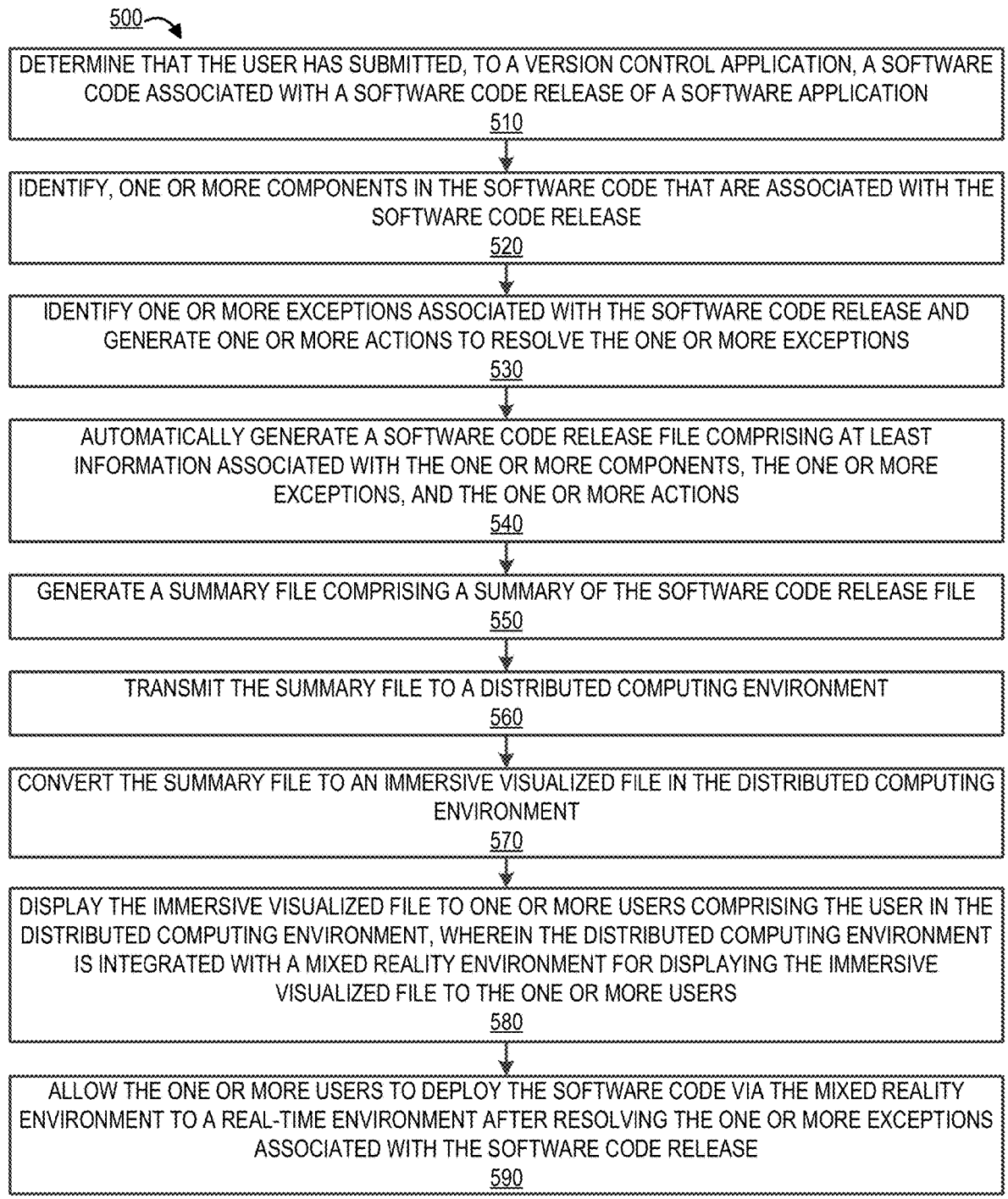
Figure 6:
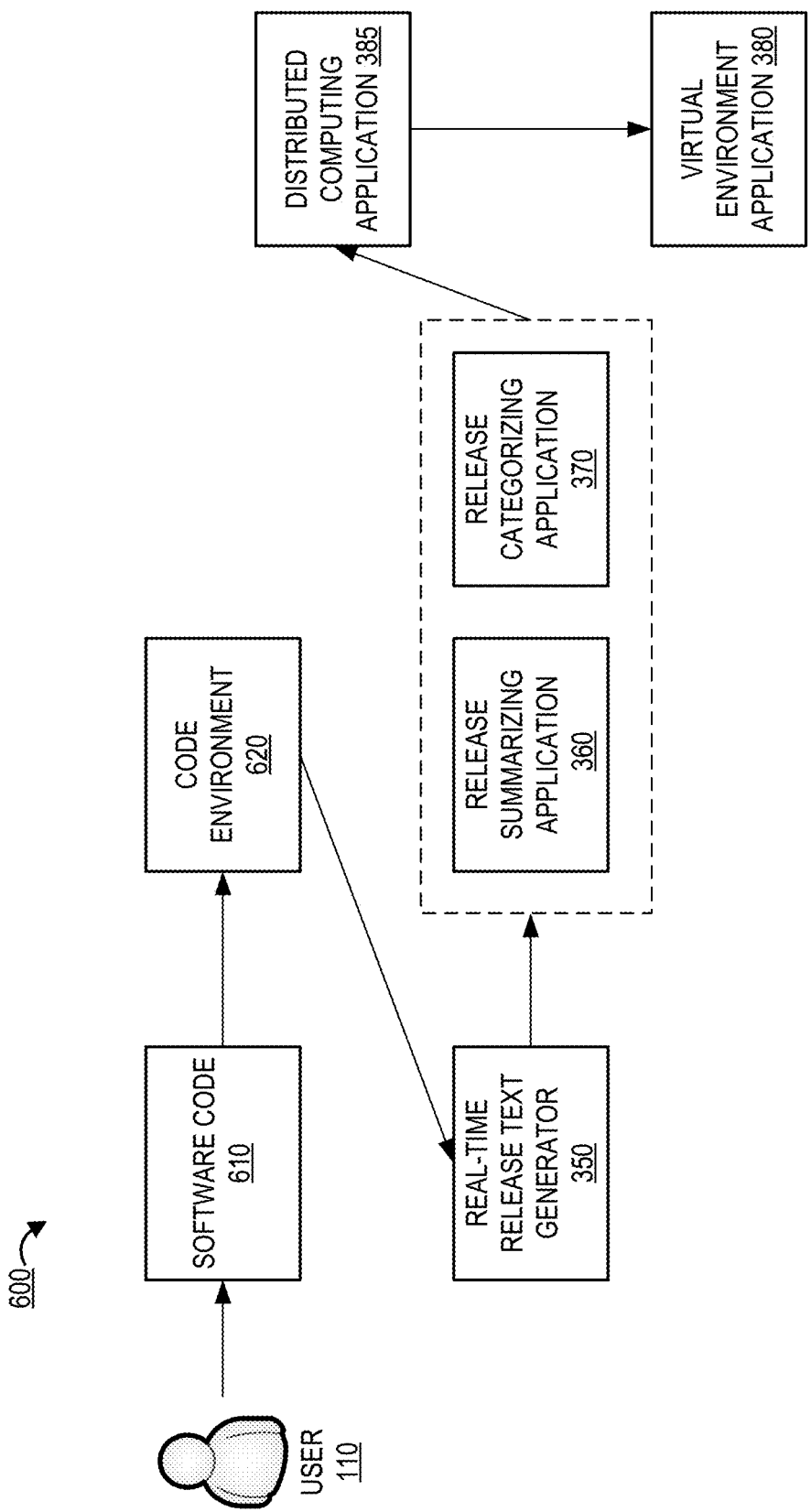

Having thus described embodiments of the invention in general terms, reference will now be made the accompanying drawings, wherein:

FIG. 1 provides a block diagram illustrating a system environment for generating and transmitting visualized software code release and deployment functions to a mixed reality environment, in accordance with an embodiment of the invention;

FIG. 2 provides a block diagram illustrating the entity system 200 of FIG. 1, in accordance with an embodiment of the invention;

FIG. 3 provides a block diagram illustrating a visualized functions generation and transmission system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for generating and transmitting visualized software code release and deployment functions to a mixed reality environment, in accordance with an embodiment of the invention; and FIG. 6 provides a block diagram for generating and transmitting visualized software code release and deployment functions to a mixed reality environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a digital ecosystem is a hypothetical iteration of the Internet as a single, universal and immersive virtual environment that is facilitated by the use of virtual reality and augmented reality devices. Thus, digital ecosystem provides the ability for a user to associate with an avatar (i.e., a virtual representation/object of the user) and for the avatar to perform one or more actions (e.g., resource exchange events, purchase of products, or the like) within a virtual environment. An example of such a digital ecosystem is a Metaverse.

As described herein, the term "entity" may be any entity registered on a Metaverse to conduct one or more operations. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution. In some embodiments, the entity may be any organization that develops applications associated with an entity, where the applications support one or more organizational activities associated with entity or other entities.

Many of the example embodiments and implementations described herein contemplate interactions engaged in by a user with a computing device and/or one or more communication devices and/or secondary communication devices. A "user", as referenced herein, may refer to a customer of the entity. In some embodiments, the term "user" may refer to a potential customer of the entity. Furthermore, as used herein, the term "user computing device" or "mobile device" may refer to augmented reality devices, virtual reality devices, mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, an entity may develop one or more entity applications (e.g., software applications) to handle one or more organizational activities associated with the entity. Such entity applications may be developed and deployed to a real-time environment over multiple release cycles, where each release cycle is associated with developing a fixed set of requirements associated with the entity application that is being developed. However, when the software code associated with a release cycle is deployed to the real-time environment, there may be deployment issues or software code performance issues that were difficult to identify while the software code is in development phase and/or testing phase. In such instances, when the software code is deployed into the real-time environment with such issues, performance of the entity application may decline which may in turn result in downtime of the entity application. As such, there exists a need for a system that can overcome these issues and allow for easier integration and deployment of software codes.

FIG. 1 provides a block diagram illustrating a system environment 100 for generating and transmitting visualized software code release and deployment functions to a mixed reality environment, in accordance with an embodiment of the invention. As illustrated in FIG. 1, the environment 100 includes a visualized functions generation and transmission system 300, an entity system 200, a computing device system 400, and a virtual environment system 201. One or more users 110 may be included in the system environment 100, where the users 110 interact with the other entities of the system environment 100 via a user interface of the computing device system 400. In some embodiments, the one or more user(s) 110 of the system environment 100 may be employees (e.g., full time employees, part time employees, contractors, sub-contractors) of an entity associated with the entity system 200. In some embodiments, the one or more users 110 may be users of the virtual environment system 201.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that is part of a digital universe, such as a Metaverse. In some embodiments, the entity system(s) 200 may be a part of a distributed computing environment. In some embodiments of the invention, the entity may employ the distributed computing environment for hosting systems, servers, databases, applications, or the like.

The virtual environment system 201 may be one or more systems that provide access to one or more digital ecosystems associated with one or more entities and also maintain and manage the one or more digital ecosystems associated with the one or more entities. In some embodiments, the virtual environment system 201 may be a part of the entity system 200, where the entity system 200 provides access, manages, maintains, controls, and/or the like a digital ecosystem associated with the entity. As such, there may be multiple systems and/or virtual environment systems associated with the other entities that have digital ecosystems set up in the virtual environment.

The visualized functions generation and transmission system 300 is a system of the present invention for performing one or more process steps described herein. In some embodiments, the visualized functions generation and transmission system 300 may be an independent system. In some embodiments, the visualized functions generation and transmission system 300 may be a part of the entity system 200. In some embodiments, the visualized functions generation and transmission system 300 may be controlled, owned, managed, and/or maintained by the entity associated with the entity system 200.

The visualized functions generation and transmission system 300, the entity system 200, the computing device system 400, the one or more capturing devices 301, and the virtual environment system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the visualized functions generation and transmission system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the visualized functions generation and transmission system 300, and/or entity system 200 across the network 150. In some exemplary embodiments of the invention, the computing device system 400 may be Virtual Reality glasses, virtual reality headsets, a desktop computer, smartphone, Augmented Reality glasses, Virtual Reality gloves, wrist-based bands, and/or any other devices used to access a digital universe.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a visualized functions generation and transmission application 250, one or more entity applications 270, and a data repository 280 comprising historical transaction data, historical product level data associated with one or more transactions performed by the users, and the like. The one or more entity applications 270 may be any applications developed, supported, maintained, utilized, and/or controlled by the entity. The computer-executable program code of the network server application 240, the visualized functions generation and transmission application 250, the one or more entity application 270 to perform certain logic, data-extraction, and data-storing functions of the entity system 200 described herein, as well as communication functions of the entity system 200.

The network server application 240, the visualized functions generation and transmission application 250, and the one or more entity applications 270 are configured to store data in the data repository 280 or to use the data stored in the data repository 280 when communicating through the network communication interface 210 with the visualized functions generation and transmission system 300, and/or the computing device system 400 to perform one or more process steps described herein. In some embodiments, the entity system 200 may receive instructions from the visualized functions generation and transmission system 300 via the visualized functions generation and transmission application 250 to perform certain operations. The visualized functions generation and transmission application 250 may be provided by the visualized functions generation and transmission system 300. The one or more entity applications 270 may be any of the applications used, created, modified, facilitated, developed, and/or managed by the entity system 200.

FIG. 3 provides a block diagram illustrating the visualized functions generation and transmission system 300 in greater detail, in accordance with embodiments of the invention. As illustrated in FIG. 3, in one embodiment of the invention, the visualized functions generation and transmission system 300 includes one or more processing devices 320 operatively coupled to a network communication interface 310 and a memory device 330. In certain embodiments, the visualized functions generation and transmission system 300 is operated by an entity, such as a financial institution. In other embodiments, the visualized functions generation and transmission system 300 is operated by a non-financial institution. In some embodiments, the visualized functions generation and transmission system 300 is owned or operated by the entity of the entity system 200. In some embodiments, the visualized functions generation and transmission system 300 may be an independent system. In alternate embodiments, the visualized functions generation and transmission system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the visualized functions generation and transmission system 300 described herein. For example, in one embodiment of the visualized functions generation and transmission system 300, the memory device 330 includes, but is not limited to, a network provisioning application 340, a real-time release text generator 350, a release summarizing application 360, a release categorizing application 370, a virtual environment application 380, a distributed computing application 385, and a data repository 390 comprising any data processed or accessed by one or more applications in the memory device 330. The computer-executable program code of the network provisioning application 340, the real-time release text generator 350, the release summarizing application 360, the release categorizing application 370, the virtual environment application 380, and the distributed computing application 385 may instruct the processing device 320 to perform certain logic, data-processing, and data-storing functions of the visualized functions generation and transmission system 300 described herein, as well as communication functions of the visualized functions generation and transmission system 300.

The network provisioning application 340, the real-time release text generator 350, the release summarizing application 360, the release categorizing application 370, the virtual environment application 380, and the distributed computing application 385 are configured to invoke or use the data in the data repository 390 when communicating through the network communication interface 310 with the entity system 200, and/or the computing device system 400.

In some embodiments, the network provisioning application 340, the real-time release text generator 350, the release summarizing application 360, the release categorizing application 370, the virtual environment application 380, and the distributed computing application 385 may store the data extracted or received from the entity system 200, and the computing device system 400 in the data repository 390. In some embodiments, the network provisioning application 340, the real-time release text generator 350, the release summarizing application 360, the release categorizing application 370, the virtual environment application 380, and the distributed computing application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a visualized functions generation and transmission application 421, entity application 424. These applications also typically instructions to a graphical user interface (GUI) on the display 430 that allows the user 110 to interact with the entity system 200, the visualized functions generation and transmission system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the visualized functions generation and transmission application 421 provided by the visualized functions generation and transmission system 300 allows the user 110 to access the visualized functions generation and transmission system 300. In some embodiments, the entity application 424 provided by the entity system 200 and the visualized functions generation and transmission application 421 allow the user 110 to access the functionalities provided by the visualized functions generation and transmission system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for generating and transmitting visualized software code release and deployment functions to a mixed reality environment, in accordance with an embodiment of the invention. As shown in block 510, the system determines that the user has submitted, to a version control application, a software code associated with a software code release of a software application. The software code may be developed by any employee (e.g., developer, administrator, software architect, testing engineer, or the like) associated with an entity (e.g., financial institution or a non-financial institution). In some embodiments, the entity may be any organization that develops, maintains, utilizes, and/or manages one or more software applications for performing organizational activities. The version control application may be any application that may be employed by the entity to track and manage changes to software code associated with one or more entity applications of the entity. An entity application may be developed in 'n' number of release cycles, where one or more requirements associated with the entity application may be developed in each of the 'n' number of release cycles. The user may develop software code related to one or more requirements associated with a current release cycle of the software application and may submit the software code to the version control application.

As shown in block 520, the system identifies, one or more components in the software code that are associated with the software code release. The system may comprise one or more machine learning models which are trained to identify the one or more components from the software code. For example, the system may identify that the software code submitted by the user may comprise two front end components (e.g., user interface components such as HTML components, or the like), one database component (e.g., SQL server component), and one backend component (e.g., Python component, Node JS component, or the like).

As shown in block 530, the system identifies one or more exceptions associated with the software code release and generates one or more actions to resolve the one or more exceptions. The system may extract one or more logs associated with associated with historical software code releases associated with the software application and other software applications similar to the software application. The system, via the machine learning models, then analyzes the software code submitted by the user in block 510 and compares it with log information in the one or more logs associated with historical software code releases to identify one or more patterns. Based on the one or more patterns, the system may identify one or more exceptions associated with the current software code release. For example, the system may identify that the software code and data associated with the software code may require a high performance server for the software code to run efficiently. The system may further identify that the current server assigned for running the software code is a low performance server based on patterns in the log information associated with the historical software code releases and may identify it as an exception. The system, in response to identifying the one or more exceptions, may determine an action for resolving the one or more exceptions from the log information associated with the historical software code releases. Continuing with the previous example, the system may identify that a server 'A' was previously assigned to address similar performance and efficiency issues and may provide an action to change server 'X' that is currently assigned to run the software code to server 'A.' It should be understood that the examples described herein are for explanatory purposes only and do not delineate the scope of the invention.

As shown in block 540, the system automatically generates a software code release file comprising at least information associated with the one or more components, the one or more exceptions, and the one or more actions. The system may generate the software code release file which comprises micro level technical details associated with the software code release. For example, the software code release file may be a four page document comprising information associated with the components, exceptions, and actions associated with current release cycle.

As shown in block 550, the system generates a summary file comprising a summary of the software code release file. Continuing with the previous example, the system may reduce the four page document generated in block 540 to a two paragraph summary, where the two paragraph summary comprise important information associated with the software code release. The system may utilize trained machine learning models to identify the key features from the software code release file and generate the summary file. In one example, the system may comprise details associated with release date, release time, the one or more components, the one or more exceptions, and the one or more actions. The system, via the machine learning models, may further categorize the one or more exceptions. For example, the system may identify that there are five exceptions and may categorize the five exceptions (e.g., two front end exception, one database exception, and two backend exceptions).

As shown in block 560, the system transmits the summary file to a distributed computing environment. In some embodiments, the entity may employ the distributed computing environment for hosting one or more servers, systems, applications, databases, or the like to manage organizational operations across different geographical locations. As shown in block 570, the system converts the summary file to an immersive visualized file in the distributed computing environment. In some embodiments, the immersive visualized file may comprise visual representations of the summary in the summary file. In one example, the immersive visualized file may comprise diagrams. In another example, the immersive visualized file may comprise diagrams images. In one other example, the immersive visualized file may comprise animated features.

As shown in block 580, the system displays the immersive visualized file to one or more users comprising the user in the distributed computing environment, wherein the distributed computing environment is integrated with a mixed reality environment for displaying the immersive visualized file to the one or more users. In an example, the immersive visualized file may comprise visual interactive elements, where one or more users can interact with the elements, via virtual reality devices or augmented reality devices, to perform one or more steps in the process flow described below. The one or more users may utilize any mixed reality devices to view the immersive visualized file that is being displayed in the mixed reality environment.

In some embodiments, the system may display the immersive visualized file to specific users of the one or more users. The system may automatically determine that a first user, a second user, and a third user may be capable of handling the exceptions based on categorization of exceptions, availability, and historical performance and may display the immersive visualized file to the first user, the second user, and the third user. In other words, the system may auto-configure roles of the one or more users of the entity based on components of the software code that is associated with the current software code release cycle, exceptions and corresponding actions associated with the software code, availability of the one or more users, geographical location of the one or more users, historical performance of the one or more users (e.g., for handling similar exceptions or software code associated with similar components), historical reactions captured by VR/AR devices when presented with similar immersive visualized files, and/or the like.

As shown in block 590, the system allows the one or more users to deploy the software code via the mixed reality environment to a real-time environment after resolving the one or more exceptions associated with the software code release. In one embodiment, upon receiving a deploy command via a mixed reality device of the user, the system may automatically deploy the software code to a real-time production environment, where the requirements associated with the software code release cycle are visible to end-users (e.g., consumers of the software application).

FIG. 6 provides a block diagram for generating and transmitting visualized software code release and deployment functions to a mixed reality environment, in accordance with an embodiment of the invention. As shown, the user 110 may submit a software code 610 to a version control application 620. Upon submission of the software code 610, the real-time release text generator generates the software code release file comprising at least one of one or more components, one or more exceptions, and one or more actions associated with the software code 610 which are identified by machine learning models present in the real-time release text generator 350. The software code release file is then transmitted to release categorizing application 370 which comprises one or more machine learning models (e.g., Bidirectional Encoder Representations from Transformers (BERT)) for categorizing one or more exceptions present in the software code release file. As shown, the release summarizing application 360 then generates a summary file comprising a summary of the software code release file and input received from the release categorizing application 370. The summary file is then transmitted to a distributed computing environment via the distributed computing application 385, where the summary file is automatically converted to an immersive visualized file for display to a selective set of users determined by the system in a mixed reality environment, via a mixed reality application (e.g., the virtual reality application 380).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating and transmitting visualized software code release and deployment functions to a mixed reality environment, the system comprising:
   at least one network communication interface;
   at least one non-transitory storage device; and
   at least one processing device coupled to the at least one non-transitory storage device and the at least one network communication interface, wherein the at least one processing device is configured to:
   determine that a user has submitted, to a version control application, a software code associated with a software code release of a software application;
   in response to determining that the user has submitted the software code, identify, one or more components in the software code that are associated with the software code release;
   automatically generate a software code release file comprising at least information associated with the one or more components;
   generate a summary file comprising a summary of the software code release file;
   transmit the summary file to a distributed computing environment;
   convert the summary file to an immersive visualized file in the distributed computing environment; and
   display the immersive visualized file to one or more users comprising the user in the distributed computing environment, wherein the distributed computing environment is integrated with a mixed reality environment for displaying the immersive visualized file to the one or more users.

2. The system of claim 1, wherein the at least one processing device is configured to:
   extract one or more logs associated with historical software code releases associated with the software application and other software applications similar to the software application;
   identify one or more patterns in the software code that match log information in the one or more logs; and
   identify one or more exceptions associated with the software code release based on the one or more patterns.

3. The system of claim 2, wherein the at least one processing device is configured to generate one or more actions to resolve the one or more exceptions.

4. The system of claim 3, wherein the at least one processing device is configured to generate the software code release file comprising the one or more exceptions and the one or more actions to resolve the one or more exceptions.

5. The system of claim 2, wherein the at least one processing device is configured to categorize the one or more exceptions associated with the software code release.

6. The system of claim 2, wherein the at least one processing device is configured to auto-configure roles associated with the one or more users based on historical data to handle the one or more exceptions associated with the software code release.

7. The system of claim 6, wherein the at least one processing device is configured to allow the one or more users to deploy the software code via the mixed reality environment to a real-time environment after resolving the one or more exceptions associated with the software code release.

8. A computer program product for generating and transmitting visualized software code release and deployment functions to a mixed reality environment, the computer program product comprising a non-transitory computer-readable storage medium having computer executable instructions for causing a computer processor to perform the steps of:

determining that a user has submitted, to a version control application, a software code associated with a software code release of a software application;

in response to determining that the user has submitted the software code, identifying, one or more components in the software code that are associated with the software code release;

automatically generating a software code release file comprising at least information associated with the one or more components;

generating a summary file comprising a summary of the software code release file;

transmitting the summary file to a distributed computing environment;

converting the summary file to an immersive visualized file in the distributed computing environment; and displaying the immersive visualized file to one or more users comprising the user in the distributed computing environment, wherein the distributed computing environment is integrated with a mixed reality environment for displaying the immersive visualized file to the one or more users.

9. The computer program product of claim 8, wherein the computer executable instructions cause the computer processor to perform the steps of:

extracting one or more logs associated with historical software code releases associated with the software application and other software applications similar to the software application;

identifying one or more patterns in the software code that match log information in the one or more logs; and identifying one or more exceptions associated with the software code release based on the one or more patterns.

10. The computer program product of claim 9, wherein the computer executable instructions cause the computer processor to perform the step of generating one or more actions to resolve the one or more exceptions.

11. The computer program product of claim 10, wherein the computer executable instructions cause the computer processor to perform the step of generating the software code release file comprising the one or more exceptions and the one or more actions to resolve the one or more exceptions.

12. The computer program product of claim 9, wherein the computer executable instructions cause the computer processor to perform the step of categorizing the one or more exceptions associated with the software code release.

13. The computer program product of claim 9, wherein the computer executable instructions cause the computer processor to perform the step of auto-configuring roles associated with the one or more users based on historical data to handle the one or more exceptions associated with the software code release.

14. The computer program product of claim 13, wherein the computer executable instructions cause the computer processor to perform the step of allowing the one or more users to deploy the software code via the mixed reality environment to a real-time environment after resolving the one or more exceptions associated with the software code release.

15. A computer implemented method for generating and transmitting visualized software code release and deployment functions to a mixed reality environment, wherein the method comprises:

determining that a user has submitted, to a version control application, a software code associated with a software code release of a software application;

in response to determining that the user has submitted the software code, identifying, one or more components in the software code that are associated with the software code release;

automatically generating a software code release file comprising at least information associated with the one or more components;

generating a summary file comprising a summary of the software code release file;

transmitting the summary file to a distributed computing environment;

converting the summary file to an immersive visualized file in the distributed computing environment; and displaying the immersive visualized file to one or more users comprising the user in the distributed computing environment, wherein the distributed computing environment is integrated with a mixed reality environment for displaying the immersive visualized file to the one or more users.

16. The computer implemented method of claim 15, wherein the method comprises:

extracting one or more logs associated with historical software code releases associated with the software application and other software applications similar to the software application;

identifying one or more patterns in the software code that match log information in the one or more logs; and identifying one or more exceptions associated with the software code release based on the one or more patterns.

17. The computer implemented method of claim 16, wherein the method further comprises generating one or more actions to resolve the one or more exceptions.

18. The computer implemented method of claim 17, wherein the method comprises generating the software code release file comprising the one or more exceptions and the one or more actions to resolve the one or more exceptions.

19. The computer implemented method of claim 16, wherein the method further comprises categorizing the one or more exceptions associated with the software code release.

20. The computer implemented method of claim 19, wherein the method further comprises auto-configuring roles associated with the one or more users based on historical data to handle the one or more exceptions associated with the software code release.

\* \* \* \* \*